United States Patent [19]
Zeidler

[11] 3,781,550
[45] Dec. 25, 1973

[54] RECEIVER FOR LASER BEAMS
[75] Inventor: Guenter Zeidler, Munich, Germany
[73] Assignee: Siemens Aktiengesellschaft, Berlin and Munich, Germany
[22] Filed: June 14, 1972
[21] Appl. No.: 262,531

[30] Foreign Application Priority Data
Aug. 12, 1971 Germany.................. P 21 40 500.0

[52] U.S. Cl............................. 250/211 J, 250/227
[51] Int. Cl......... G02b 5/14, H01j 5/16, H01j 39/12
[58] Field of Search................ 250/199, 211 J, 227, 250/83.3 R; 330/4.3

[56] References Cited
UNITED STATES PATENTS
3,626,312  12/1971  Snitzer................................. 330/4.3
3,584,230   6/1971  Tien.................................. 250/199 X
3,535,532  10/1970  Merryman....................... 250/211 J
2,991,366   7/1961  Salzberg......................... 250/83.3 R Primary Examiner—James W. Lawrence
Assistant Examiner—T. N. Grigsby
Attorney—Benjamin H. Sherman et al.

[57] ABSTRACT

A receiver for receiving laser beams preferably from a laser transmitter of a distance measuring device characterized in that at least a semiconductor photo diode, an amplifying laser, and an optical coupling unit are integrally formed on a carrier member to minimize misalignment therebetween during handling and transporting of the receiver. Preferably, the active material such as neodymium has a high index of refraction and is surrounded by material of a low index of refraction to form a wave conductor which preferably has a serpentine configuration to conduct the received laser beam and amplify it prior to projecting it on a silicon or germanium photo diode. In one embodiment of the invention, the current supply unit for the photo diode, the unit for amplifying the output current of the photo diode, and the power supply unit for the laser are integrally formed on the carrier unit along with the photo diode, the amplifying laser and optical coupler.

13 Claims, 5 Drawing Figures

PATENTED DEC 25 1973  3,781,550

RECEIVER FOR LASER BEAMS

BACKGROUND OF THE INVENTION

1. Field of the Invention

The present invention is directed to a receiver for receiving and amplifying a laser beam particularly a receiver used in a distance measuring device utilizing a laser beam.

2. Prior Art:

Distance measuring equipment, which utilized a laser beam, display a high degree of measuring sensitivity and accuracy and are capable of measuring large distances. By utilizing a laser amplifier in a receiver portion of the measuring equipment for pre-amplifying the beam prior to detection by a semiconductor photo diode, the size or the distance that can be measured with the measuring equipment can be greatly enlarged. Such a receiving unit for receiving the beam having a wave length of approximately 1 μm is described in the German patent application No. 1,935,740. In this device, a neodymium-doped solid state laser is utilized as a light signal pre-amplifier.

The receiver portion for the laser beam is made of many separate components and includes a number of lenses, shutters and at least one filter which must be arranged at a prescribed distance from the pre-amplifier laser and the detector photo diode portion. Thus, the receiver includes adjustment means such as an optical bank. A receiver for light signals or laser signals which is designed in the above mentioned way is constructed of individual parts which are vibration-resistant. Such a receiver is cumbersome for transportation from one location to another and the transporting of the receiver may have adverse effects on its operation due to misalignment between the particular portions of the receiver.

SUMMARY OF THE INVENTION

The present invention is directed to a receiver for receiving laser beams such as in a distance measuring device which receiver is easy to handle and easy to transport without adverse effects to its operation.

The receiver of the present invention utilizes a carrier member on which the pre-amplifying laser, the semiconductor photo diode and the coupling unit are integrally constructed on the carrier by an integrated technique. In addition to forming the pre-amplifying laser, the semiconductor photo diode and the coupling unit on the carrier member, the power supply unit for the laser, the amplifying unit for the photo diode current, and the current supply unit for the photo diode can also be integrally formed by an integrated technique on the carrier member. Preferably, the active material of the pre-amplifying laser is part of a dielectric wave conductor which is effective for the wave length of the laser beam being received from the transmitter of the distance measuring equipment and the active material has a high index of refraction and is surrounded by material having a low index of refraction which is fixed on the carrier as a thin layer.

In order to achieve a very efficient amplification of the laser or light signals, the wave conductor should be as long as possible and is preferably designed with a serpentine shape. In each of the preferred embodiments of the invention, a neodymium laser is used and the semiconductor photo diode is selected from a group consisting of germanium and silicon photo diodes. In one embodiment of the invention, the laser amplifier is in direct contact with the photo diode while in the other embodiment an immersion layer comprising either liquid or plastic is arranged between the active surface of the photo diode and the laser. In operating the receiver of the present invention, the pumping energy should be supplied in pulses, and is synchronized so that the pumping energy is applied to the laser at the expected time for receiving the echo signal.

DESCRIPTION OF THE PREFERRED EMBODIMENTS

Figure 1:
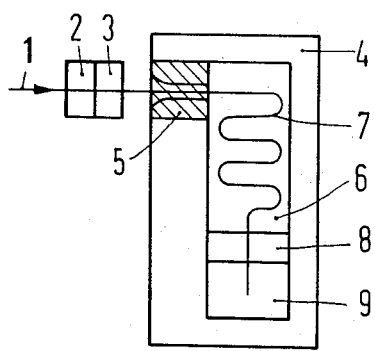
FIG. 1 is a schematic illustration of one embodiment of the present invention.

The principles of the present invention are particularly useful when incorporated in a receiver for a light beam such as a laser beam in a distance measuring equipment which receiver is schematically illustrated in FIG. 1. The receiver comprises a separate optical focusing means or system 2 which is arranged to receive a light beam 1 which may be a laser beam echo from the transmitter of the distance measuring device. From the optical focusing means 2, the beam 1 passes through a filter 3 and is received by a wave-conducting coupling device 5 which is affixed on a carrier member 4. The wave-conducting coupling device 5 reduces the cross-section of the light beam which is being received and conducts it into a pre-amplifying laser device 6. Since a resonation of the signal in the active material of the laser 6 could create erroneous signals, the laser device 6 does not include a resonator as does a laser transmitter.

The pre-amplifying laser 6 includes an active material which forms part of a wave conductor 7 which, as illustrated, has a serpentine shape and extends from the coupling device 5 and terminates at a filter 8 which is disposed between the active material of the laser 6 and a semiconductor photo diode 9.

In the embodiment of FIG. 1, the power supply unit supplying the pumping energy to the active material of the laser device 6 is not illustrated nor is the power supply units supplying a current to the semiconductor diode and an amplifying unit for amplifying the output current of the diode illustrated. These units are arranged on a separate carrier member so that the receiver of FIG. 1 includes the power supply units, the amplifying unit on a separate carrier, the carrier 4, the filter 3, and the optical focusing system 2.

Figure 2:
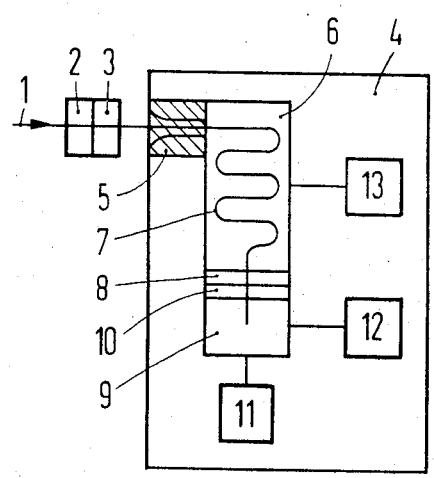
FIG. 2 is a schematic illustration of a second embodiment of the present invention.

In the embodiment of FIG. 2, the carrier member 4 has formed thereon a power supply unit 11 for applying a current to the photo diode 9, an amplifying unit 12 for amplifying the output current of the photo diode and a power supply unit 13 for applying current to a pumping device for stimulating the active material of the laser 6. In addition to integrally forming the units 11, 12 and 13 on the carrier 4, an immersion material 10 is disposed between the second filter 8 and the photo diode 9. The immersion material can be either a liquid or a plastic.

In the embodiment of FIG. 1, the optical coupling means or device 5, the laser 6 and photo diode are formed in an integrated manner on the carrier 4. In the embodiment of FIG. 2, the power supply units 11 and 13 along with the amplifying unit 12 are also formed in an integrated manner on the carrier 4.

Figure 3:
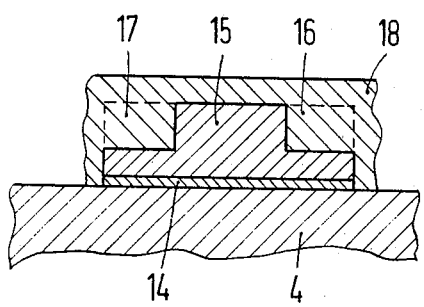
FIG. 3 is a cross-section of the laser-active material on a carrier for either embodiment of the present invention.

As illustrated in FIG. 3, a laser 6 can be constructed in an unintegrated way on the carrier plate 4 by first applying a thin layer 14 of glue which has a low index of refraction. The active material 15, which is a single crystal, of the laser 6 is attached to the carrier plate 4 by the glue layer 14.

In order to prevent many modes from spreading in the active material 15 of the laser, it is provided with a small cross-section. This is achieved by removing portions 16 and 17 of the active material 15 in a conventional manner such as by an etching process. The wide portion of the active material 15, which is adjacent to the layer 14, serves to mount and hold the active material in a stable manner on the carrier 4. After removing the portions from the crystal forming the active material, an outer transparent member 18 which has an index of refraction lower than the index of refraction of the active material 15, is applied as illustrated. When removing the portions 16 and 17 of the active material 15, the serpentine path of the light conductor is formed in the active material 15.

The laser active material 15 is provided with a small cross-section to prevent any modes from spreading in the laser member. The wave conductor portion of the laser active material 15 should be as long as possible to provide a very effective amplification of the light signal. The small cross-section of the active material enables a small radius of curvature for the turns and with a minimum light loss for the light conductor. To minimize light loss due to scattering, all the light entry and exit surfaces in the receiver should be polished.

The active material of the laser 6 should be the same material as the active material of the laser beam transmitter utilized with the receiver. If the laser-active material of the transmitter and the receiver are both the same, the frequency of the transmitter and receiver light beams or laser beams are the same and can be amplified in a laser pre-amplifier in an optimum manner. Preferably, a neodymium laser is used in both the receiver and transmitter and the output of the neodymium laser amplifier is very well matched to an avalanche semiconductor photo diode consisting of either germanium or silicon.

The filter 3 in each embodiment serves the purpose of filtering out light which is not part of the laser beam transmitted by the laser transmitter. The filter 8, which is disposed between the laser 6 and the photo diode 9, is for the purpose of narrowing the band width of the laser amplifier 6 from a band width of 100 to 1,000 GHz to approximately 1GHz.

Figure 4:
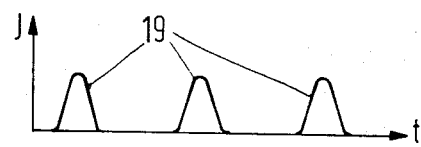
FIG. 4 is a curve illustrating the time and intensity relationship of the expected signal received by the receiver of the present invention.
Figure 5:
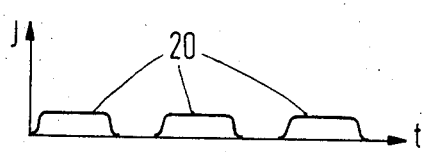
FIG. 5 is a curve illustrating the line and intensity of the pumping pulses applied to the laser of the present invention.

When utilizing the receiver illustrated in FIGS. 1 and 2 in a distance measuring device, the laser 6 should have the pumping energy supplied in pulses with the application of the pumping pulse of energy being synchronized with the time of the expected echo. FIG. 4. illustrates the time and intensity relationship for signals 19 received by the receiver, which signals 19 are in the form of discrete light pulses. FIG. 5 illustrates the time and intensity relationship for applying the pumping pulses of energy 20 to a pumping light (not illustrated) for the laser 6. With the synchronization of the pumping pulses with the expected time for receiving the signal pulses, any light signals which are received before or after the time of the pumping pulse are not amplified. Thus, faulty measurements due to the amplification of non-transmitted light pulses are reduced.

Although various minor modifications may be suggested by those versed in the art, it should be understood that I wish to employ within the scope of the patent granted hereon all such modifications that reasonably and properly come within the scope of my contribution to the art.

I claim:

1. In a receiver for use as a component of a laser distance measuring device for receiving a laser beam, the receiver comprising, a receiving optical system, an optical coupling, an optical filter, a pre-amplifying laser, a power supply for the laser, a semiconductor photo diode, a current supply unit for the photo diode, and an amplifying unit for the photo diode output current, the improvements comprising the optical coupling device being a wave conductor with an enlarged light admission area to reduce the cross section of beam being received and a carrier member having integrally formed thereon at least the optical coupling device, the pre-amplifying laser, and the semiconductor photo diode so that during movement of the receiver, the coupling device, the pre-amplifying laser and the photo diode are substantially free from misalignment.

2. In a receiver according to claim 1, wherein the active material of the pre-amplifying laser is the same as the active material of the laser producing the laser beam being received by the receiver.

3. In a receiver according to claim 1, wherein the pre-amplifying laser is a neodymium laser.

4. In a receiver according to claim 1, wherein the semiconductor photo diode is an avalanche photo diode of a semiconductor material selected from a group comprising germanium and silicon.

5. In a receiver according to claim 1, wherein the active surface of the semiconductor photo diode is in direct contact with the preamplifying laser.

6. In a receiver according to claim 1, which includes the current supply unit for the photo diode, an amplifying unit for the photo diode current, and the power supply for the laser being disposed on the carrier member with each unit being integrally formed thereon.

7. In a receiver according to claim 1, wherein the active material of the pre-amplifying laser forms a part of a dielectric wave conductor having a serpentine configuration and a small cross-section, said active material having a high index of refraction and being surrounded by a material of a low index of refraction which material of low index of refraction is affixed as a thin layer on said carrier member.

8. In a receiver according to claim 1, wherein the active material of the pre-amplifying laser forms part of a dielectric wave conductor which is effective for the wave length of the laser beam being received by the receiver, said wave conductor consisting of a material having a high index of refraction, and being surrounded by a material having a low index of refraction.

9. In a receiver according to claim 8, wherein the material having a low index of refraction is affixed to the carrier member as a thin layer.

10. In a receiver according to claim 8, wherein the wave conductor has a serpentine configuration.

11. In a receiver according to claim 1, which further includes a layer of immersion material disposed between the active surface of the semiconductor photo diode and the pre-amplifying laser.

12. In a receiver according to claim 11, wherein said immersion material is a plastic material.

13. In a receiver according to claim 11, wherein said immersion material is a liquid material.

* * * * *